(12) United States Patent
Weaver et al.

(10) Patent No.: US 10,370,983 B2
(45) Date of Patent: Aug. 6, 2019

(54) ENDWALL COOLING SYSTEM

(71) Applicant: Rolls-Royce Corporation, Indianapolis, IN (US)

(72) Inventors: John A. Weaver, Indianapolis, IN (US); Tony A. Lambert, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 235 days.

(21) Appl. No.: 15/663,462

(22) Filed: Jul. 28, 2017

(65) Prior Publication Data
US 2019/0032495 A1    Jan. 31, 2019

(51) Int. Cl.
| F01D 5/00 | (2006.01) |
| F01D 5/18 | (2006.01) |
| F04D 29/22 | (2006.01) |
| F01D 25/12 | (2006.01) |
| F01D 5/14 | (2006.01) |
| F04D 29/58 | (2006.01) |
| F01D 9/04 | (2006.01) |

(52) U.S. Cl.
CPC ............ *F01D 5/188* (2013.01); *F01D 5/145* (2013.01); *F01D 5/187* (2013.01); *F01D 9/041* (2013.01); *F01D 25/12* (2013.01); *F04D 29/2255* (2013.01); *F04D 29/2272* (2013.01); *F04D 29/5846* (2013.01); *F05D 2240/81* (2013.01); *F05D 2250/12* (2013.01); *F05D 2250/141* (2013.01); *F05D 2260/20* (2013.01); *F05D 2260/22141* (2013.01)

(58) Field of Classification Search
CPC .......... F01D 5/188; F01D 5/187; F01D 9/041; F01D 5/145; F01D 25/12; F04D 29/5846; F04D 29/2272; F04D 29/2255; F05D 2260/22141; F05D 2240/81; F05D 2250/141; F05D 2260/20; F05D 2250/12
See application file for complete search history.

(56) References Cited

U.S. PATENT DOCUMENTS

| 3,800,864 A | * | 4/1974 | Hauser ................... F01D 25/12 |
| | | | 165/47 |
| 4,135,855 A | * | 1/1979 | Peill ....................... F01D 5/188 |
| | | | 415/115 |
| 4,153,386 A | * | 5/1979 | Leogrande .............. F01D 5/188 |
| | | | 415/115 |
| 4,946,346 A | * | 8/1990 | Ito ........................... F01D 5/189 |
| | | | 415/115 |
| 5,197,852 A | | 3/1993 | Walker et al. |

(Continued)

FOREIGN PATENT DOCUMENTS

EP    1 990 507 B1    4/2015

*Primary Examiner* — Thomas N Moulis
(74) *Attorney, Agent, or Firm* — Brinks Gilson & Lione

(57) ABSTRACT

An air distribution system for cooling a component in a heated gas environment may be provided, where the air distribution system includes a wall and a plate. The wall includes an inner surface, an outer surface configured to be exposed to the heated gas environment, and a protrusion extending from the inner surface of the wall. The plate is fixedly coupled to the protrusion and is space apart from the inner surface of the wall. The plate includes an outer edge. A passage is defined between the plate and the inner surface of the wall. The inlet of the passage is defined by the outer edge of the plate.

20 Claims, 5 Drawing Sheets

(56) References Cited

U.S. PATENT DOCUMENTS

| | | | | |
|---|---|---|---|---|
| 6,039,531 | A * | 3/2000 | Suenaga | F01D 5/186 415/115 |
| 6,398,486 | B1 * | 6/2002 | Storey | F01D 5/188 415/114 |
| 7,695,247 | B1 | 4/2010 | Liang | |
| 7,766,609 | B1 * | 8/2010 | Liang | F01D 9/041 415/138 |
| 8,011,881 | B1 | 9/2011 | Liang | |
| 8,118,554 | B1 | 2/2012 | Liang | |
| 8,221,055 | B1 | 7/2012 | Liang | |
| 8,398,364 | B1 | 3/2013 | Liang | |
| 8,459,933 | B1 | 6/2013 | Liang | |
| 8,459,935 | B1 | 6/2013 | Liang | |
| 8,517,667 | B1 * | 8/2013 | Liang | F01D 5/186 415/115 |
| 8,573,938 | B1 | 11/2013 | Liang | |
| 8,632,298 | B1 | 1/2014 | Liang | |
| 8,727,726 | B2 | 5/2014 | Butkiewicz | |
| 8,784,037 | B2 | 7/2014 | Durocher et al. | |
| 8,794,906 | B1 | 8/2014 | Liang | |
| 8,915,712 | B2 | 12/2014 | Itzel et al. | |
| 2009/0010765 | A1 * | 1/2009 | Propheter-Hinckley | F01D 5/147 416/97 R |
| 2010/0150734 | A1 * | 6/2010 | Hada | F01D 5/188 416/97 R |
| 2011/0008177 | A1 * | 1/2011 | Anguisola McFeat | F01D 5/186 416/97 R |
| 2012/0269647 | A1 * | 10/2012 | Vitt | F01D 5/186 416/97 R |
| 2013/0315725 | A1 * | 11/2013 | Uechi | F01D 5/189 415/208.1 |
| 2014/0093379 | A1 * | 4/2014 | Tibbott | F01D 5/189 416/224 |
| 2014/0286762 | A1 * | 9/2014 | Kerber | F01D 5/189 415/175 |
| 2015/0285082 | A1 * | 10/2015 | Szijarto | F01D 5/187 416/95 |
| 2016/0032764 | A1 | 2/2016 | Tibbott et al. | |
| 2016/0047271 | A1 * | 2/2016 | Castaneda | F01D 9/065 415/116 |
| 2016/0208621 | A1 * | 7/2016 | Spangler | F01D 5/188 |
| 2016/0230563 | A1 * | 8/2016 | King | F01D 5/186 |
| 2016/0348911 | A1 * | 12/2016 | Polyzopoulos | F01D 9/023 |
| 2016/0356177 | A1 * | 12/2016 | Hagan | F01D 5/189 |
| 2017/0268358 | A1 * | 9/2017 | Lee | F01D 5/189 |
| 2018/0135426 | A1 * | 5/2018 | Barker | F01D 5/187 |
| 2018/0135446 | A1 * | 5/2018 | Propheter-Hinckley | F02C 3/04 |
| 2018/0230814 | A1 * | 8/2018 | Spangler | F01D 5/187 |
| 2019/0032493 | A1 * | 1/2019 | Barker | F01D 5/186 |

* cited by examiner

ENDWALL COOLING SYSTEM

TECHNICAL FIELD

This disclosure relates to cooling systems, and, in particular to cooling systems for gas turbine engines.

BACKGROUND

Components placed within a turbine flow path of a gas turbine engine undergo considerable thermal stress from combusted gases passing through the turbine flow path. An endwall of the turbine flow path may be cooled by air delivered to the outside of the turbine flow path to prevent deformation, fracturing, or cracking of the endwall.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In some examples, an impingement plate may be brazed to the outer edge of an endwall of a turbine flow path of a gas turbine engine to create a cooling passageway between the impingement plate and the endwall. The impingement plate may have numerous small openings which control the flow of air, breaking up laminar flow of the air within the cooling passage and aiding heat transfer from the endwall to the air. However, differences in thermal expansion between the endwall and the impingement plate may cause the braze between the impingement plate and the endwall to fail. Such a failure may result in inadequate cooling of the endwall and damage to the turbine section.

An air distribution system, for example, is provided for cooling a component in a heated gas environment, such as a turbine chamber of a gas turbine engine. The air distribution system includes a wall and a plate. The wall includes having an inner surface, an outer surface, and a protrusion extending from the inner surface of the wall. The outer surface of the wall is configured to be exposed to the heated gas environment. The plate is spaced apart from the inner surface of the wall and is fixedly coupled to the protrusion. The plate includes an outer edge. A passage is defined between the plate and the inner surface of the wall. An inlet of the passage is defined by the outer edge of the plate.

One interesting feature of the systems and methods described below may be that the air distribution system may provide cooling to the wall exposed to the heated gas environment more efficiently than some other systems. Alternatively, or in addition, an interesting feature of the systems and methods described below may be that the air distribution system decreases the possibility of cracking or fracturing due to differences in thermal expansion.

Figure 1:
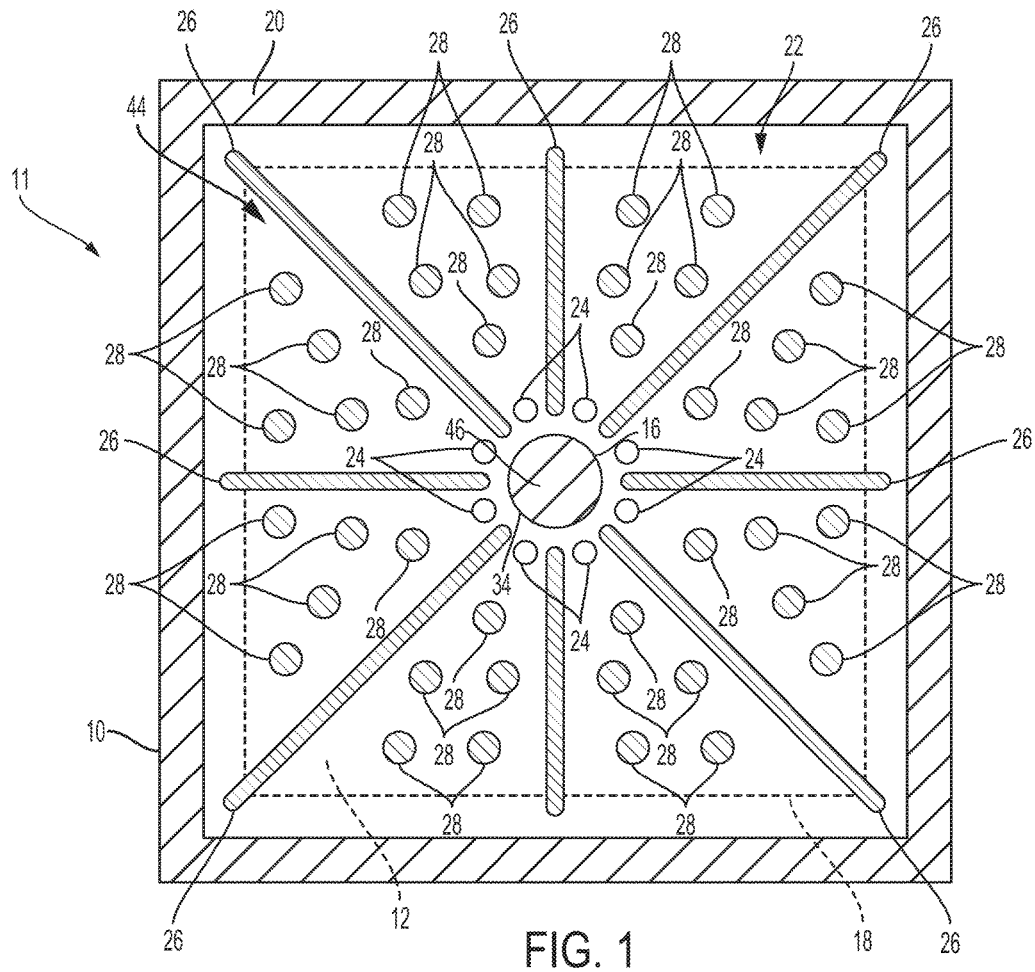
FIG. 1 illustrates a top-down cross-sectional view of a first example of an endwall cooling system.
Figure 2:
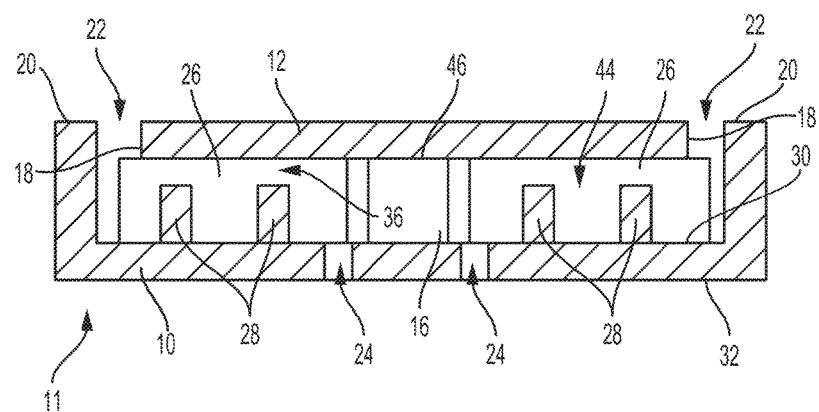
FIG. 2 illustrates a side cross-sectional view of the first example of the endwall cooling system shown in FIG. 1.

FIGS. 1 and 2 illustrate cross-sectional views of a first example of an air distribution system 11 including a wall 10 and a plate 12. The wall 10 may be any object which is shaped and configured to form a portion of the inner surface of a turbine flow path. Examples of the wall 10 may include an end wall of a gas turbine engine, a flat panel, a curved panel, or a casing having a complex shape and being adapted to be interlocked with other casings. The wall 10 may be made of any material capable of withstanding the heated gas environment of the turbine flow path, such as steel, titanium, or a ceramic matrix composite (CMC).

The wall 10 may include an inner surface 30 and an outer surface 32. The outer surface 32 may be any surface of the wall 10 that is directly exposed to the heated gas environment of the turbine flow path (see the turbine flow path 76 in FIG. 9). The outer surface 32 may be made of the same material as the wall 10, or may include an additional coating to provide better thermal resistance. The inner surface 30 may be any surface opposite of the outer surface 32 and that is not directly exposed to the heated gas environment of the turbine flow path 76. The inner surface 30 may be made of the same material as the wall 10 or may comprise an additional coating to provide oxidation protection or increase frictional force on air traveling over the inner surface 30. The inner surface 30 may also include a texturing which increases the frictional force on air traveling over the inner surface 30 to prevent or limit laminar flow over the inner surface 30 and increase cooling efficiency.

The wall 10 may include multiple outlets 24 extending between the inner surface 30 and the outer surface 32 of the wall 10. The outlets 24 may be any feature which allows fluid communication between the inner surface 30 and the outer surface 32 of the wall 10. Examples of the outlets 24 may include holes, vents, or apertures. The outlets 24 may be clustered around a particular area of the wall 10, spread evenly across the wall 10, or arranged in any other manner. The size of the outlets 24 may be consistent among the outlets 24 or may vary with respect to the position of each of the outlets 24 on the wall 10.

The wall 10 may include a raised surface 20 which extends inwardly from the inner surface 30. The raised surface 20 may be any portion of the wall 10 that defines a boundary for the area of the wall 10 to be cooled. Examples of the raised surface 20 may include a barrier, a boss, or a panel. The raised surface 20 may be located further from the outer surface 32 of the wall 10 than the inner surface 30 of the wall 10 and therefore may experience less thermal stress than other portions of the wall 10. Heat may be conducted from the outer surface 32 of the wall 10 such that the raised surface 20 experiences more thermal stress than other components of the air distribution system 11. The raised surface 20 may be made of the same materials as the wall 10 or may be made of a less heat resistant material than the wall 10. The raised surface 20 may be configured to be coupled to other portions of a gas turbine engine (60 in FIG. 8) by bolting, welding, or brazing. In some embodiments, the raised surface 20 may define a complete boundary of another portion of the wall 10. In such embodiments, the portion of the wall 10 within the boundary of the raised surface 20 may be the portion of the wall 10 to be cooled.

The plate 12 is spaced apart from the inner surface 30 of the wall 10. The plate 12 may be an object that at least partially covers the inner surface 30 of the wall 10 and which directs the flow of air proceeding toward the wall 10. Examples of the plate 12 may include a flat slab, a hemispheric disc, and a thin slice of rigid material. The plate 12 may be made of any material sufficiently rigid to direct airflow and capable of withstanding thermal stress conducted to the plate 12 from the wall 10. Examples of materials for the plate 12 may include steel, titanium, and CMC. The plate 12 may experience less thermal stress than the wall 10; therefore, in some embodiments, a coefficient of thermal expansion of the plate 12 may be less than or equal to a coefficient of thermal expansion of the wall 10.

The plate 12 includes an outer edge 18 which defines the boundary of the plate 12 covering the wall 10. The outer edge 18 may have a circular, rectangular, or other more complex shape. In some examples, the shape of the outer edge 18 may be dependent upon the number of plates 12 in the air distribution system 11 and the shape of the wall 10 and the raised surface 20. The raised surface 20 of the wall 10 may extend transversely to, and may be aligned with, the outer edge 18 of the plate 12, defining a gap between the raised surface 20 and the outer edge 18. A portion of the outer edge 18 of the plate 12 may also extend transversely to and may be aligned with the outer edge 18 of a different plate 12, defining a gap between the outer edge 18 of the plate 12 and the outer edge 18 of a different plate 12.

The plate 12 may have an intact surface extending from a first outer edge 18 of the plate to an opposing second outer edge 18 of the plate, the intact surface having no openings or holes. The intact surface may prevent air from passing through the plate 12 and force air to the outer edge 18 of the plate 12.

The air distribution system 11 may also include a protrusion 16 extending from the inner surface 30 of the wall 10 to the plate 12. The protrusion 16 may be any feature which is coupled to and spaces apart the wall 10 and the plate 12. Examples of the protrusion 16 may include a strut, a column, or a raised element. The protrusion 16 may be made of the same material as either the plate 12 or the wall 10 including steel, titanium, or CMC. The protrusion 16 may be formed integrally with the wall 10 or with the plate 12.

As shown in FIG. 1, the protrusion 16 may include a surface 46 which may be fixedly coupled to the plate 12. Alternatively, in some embodiments, the protrusion 16 may be fixedly coupled to the wall 10. The surface 46 may be fixedly coupled to the plate 12 by a variety of methods, such as bonding, brazing, or welding. The protrusion 16 may experience thermal stress conducted from the wall 10. Therefore, the size of the surface 46 of the protrusion 16 may be limited in order to reduce the risk of cracking or breaking the connection of the protrusion 16 with either of the wall 10 or the plate 12 due to differences in thermal expansion. For example, the surface 46 may be circular in shape to limit the surface area of the surface 46 to reduce the differences in thermal expansion while keeping the surface area large enough to couple to the plate 12. In some examples, the surface 46 of the protrusion 16 may have a surface area between 0.005 in$^2$ and 0.2 in$^2$. The surface area of the surface 46 of the protrusion 16 may be less than a surface area of the plate 12: for example, between 2% and 10% of the surface area of the plate 12. Similarly, the surface 46 of the protrusion may have a perimeter 34 which is less than a perimeter of the outer edge 18 of the plate 12: for example, between 2% and 35% of the perimeter of the outer edge 18 of the plate 12.

In some embodiments, the protrusion 16 may be fixedly coupled to the plate 12 at the center of the plate 12. The center of the plate 12 may be a point within the outer edge 18 of the plate 12 that maximizes the average distance of the outer edge 18 to that point. In other embodiments, the protrusion 16 may be fixedly coupled to the plate at a point offset from the center of the plate 12. In other embodiments, the protrusion 16 may be positioned wherever the thermal stress on the protrusion 16 may be minimized or limited.

A passage 44 is defined between the plate 12 and the inner surface 30 of the wall 10. The passage 44 may be any space which is open to fluid flow. Examples of the passage 44 may include a channel, a tube, or a conduit. Air may enter into the passage 44 through an inlet 22 and exit from the passage 44 through an outlet 24. The inlet 22 may be any space which allows air to enter the passage 44. Examples of the inlet 22 may include an opening, a gap, or a duct. As shown in FIGS. 1 and 2, the inlet 22 is defined by a gap between the outer edge 18 of the plate 12 and raised surface 20 of the wall 10.

The outlet 24 may be any space which allows air to exit the passage 44. Examples of the outlet 24 may include an opening, a gap, or a duct. In some embodiments, for example, as shown in FIG. 1, the outlet 24 of the passage 44 may defined by an opening extending through the wall 10 from the inner surface 30 to the outer surface 32. Air passing through the passage 44 may be delivered at a higher pressure than the pressure of the hot gas environment. Therefore, air may flow into the hot gas environment from the passage 44 to cool the outer surface 32 of the wall 10.

The outlet 24 may be positioned wherever thermal stress on the wall 10 is the highest. Alternatively, the outlet 24 may be positioned proximate to the protrusion 16 to provide additional direct cooling to the protrusion 16 and avoid differential thermal expansion between the protrusion 16 and either of the plate 12 or the wall 10. The outlet 24 may be proximate when the outlet 24 is between 0.01 inches and 1.0 inches from the protrusion 16. The average distance for air to travel between the inlet 22 and the outlet 24 may be evenly distributed to ensure even cooling of the wall 10 as the air passes over the inner surface 30. For example, as shown in FIG. 1, the protrusion 16 may be arranged at the center of the plate 12, and a plurality of outlets 24 may encircle the protrusion 16 to allow relatively even paths for air to travel from the inlet 22 at the outer edge 18 of the plate 12 to one of the plurality of outlets 24.

The passage 44 may include a rib 26 extending along a length of the passage 44 to compartmentalize the air and better direct the air from the inlet 22 to the outlet 24. The rib 26 may be any structure configured to direct the flow of air through the passage 44. Examples of the rib 26 may include a strut, a wall, or a ridge. The rib 26 may be fixedly coupled or formed as a part of one of the plate 12 or the wall 10. In some embodiments, the rib 26 may only be coupled to the wall 10, while the plate 12 rests on top of the rib 26 and having free range of movement across the rib 26. Such a configuration may allow free movement between the plate 12 and the rib 26 that may result from thermal expansion. The rib 26 may be made from any material sufficient to withstand the thermal stress within the passage 44, such as steel, titanium, or CMC. As shown in FIG. 1, a plurality of ribs 26 may be arranged in a pattern to compartmentalize and direct the flow of air through the passage 44. The ribs 26 may be arranged in symmetric patterns or have similar volumes of space between the ribs 26 to ensure even air flow throughout the passage 44.

The passage 44 may also include a pin 28 extending inwardly from the inner surface 30 of the wall 10. The pin 28 may be any object which, when placed in the passage 44, increases the turbulence of air passing through the passage 44. Examples of the pin 28 may include a cylinder, a cone, or a complex shape (e.g., a turbulator rib) meant to break up laminar airflow. Increasing the turbulent flow of the air through the passage 44 may increase the efficiency of heat transfer within the passage 44 by reducing or eliminating a boundary layer from forming along the inner surface 30 of the wall 10. The pin 28 may be made from any material sufficient to withstand the thermal stress within the passage 44, such as steel, titanium, or CMC. The pin 28 may extend outward from the inner surface 30 such that the plate 12 rests upon the pin 28 while maintaining free range of motion across the pin 28. In other embodiments, such as shown in FIG. 2, the pin 28 may extend outward from the inner surface 30 such that a gap 36 is formed between the pin 28 and the plate 12. As shown in FIG. 1, a plurality of pins 28 may be place throughout the inner surface 30 to create turbulence and break up laminar flow of air passing through the passage 44. The pins 28 may have a diameter between 0.02 inches to 0.15 inches.

Figure 3:
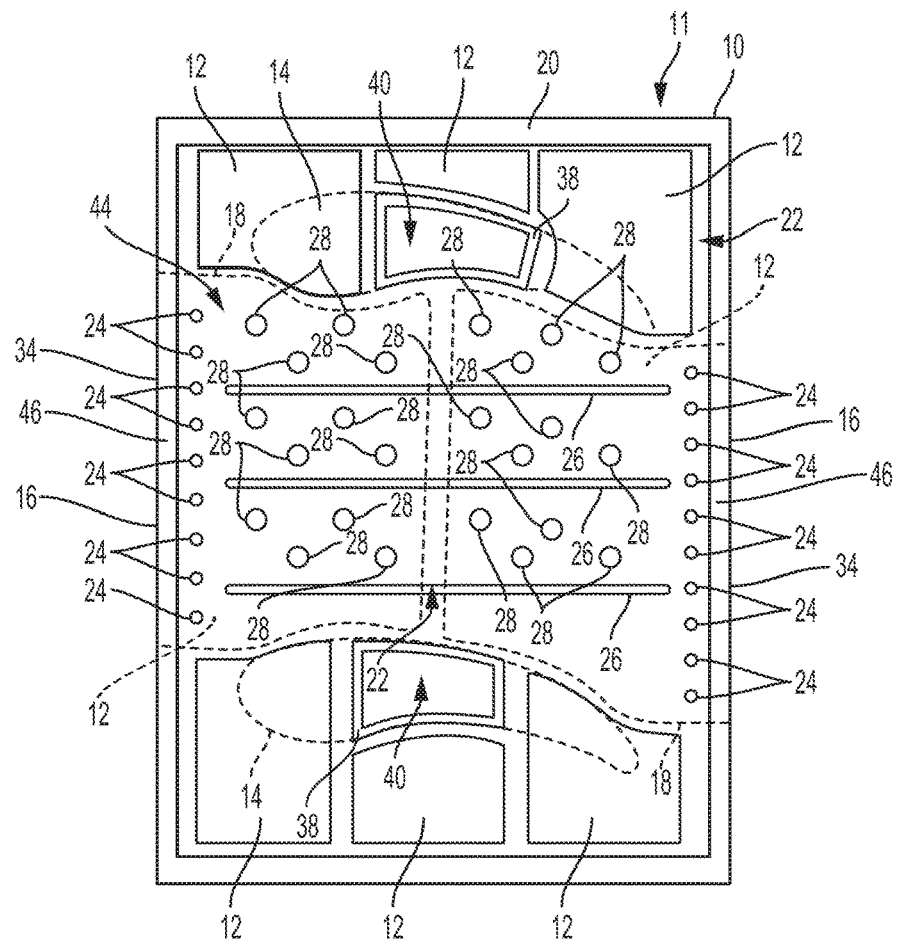
FIG. 3 illustrates a top-down partial cross-sectional view of a second example of an endwall cooling system.
Figure 4:
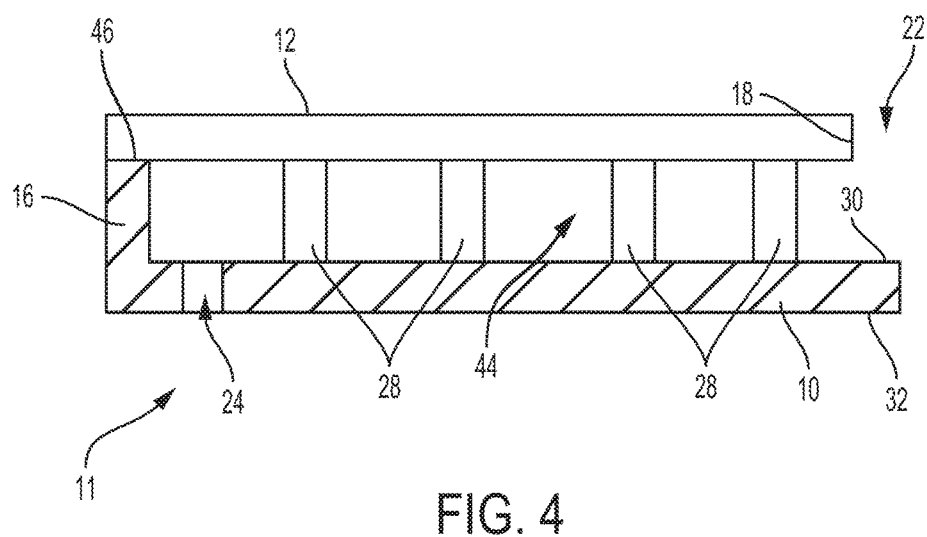
FIG. 4 illustrates a partial side cross-sectional view of the second example of the endwall cooling system shown in FIG. 3.

FIGS. 3 and 4 illustrate cross-sectional views of a second example of an air distribution system 11 including the wall 10, the plate 12, and an airfoil 14. As air is delivered to the wall 10, air may also be delivered to the airfoil 14 through a cavity 40 extending through the airfoil 14. The airfoil 14 may be any body extending outwardly into the heated gas environment from the outer surface 32 of the wall 10. Examples of the airfoil 14 may include turbine vanes, struts, or turbine blades. The airfoil 14 may include a bus 38 which encircles the cavity 40 and extends inwardly from the inner surface 30 of the wall 10. The cavity 40 may be any space within the airfoil 14 configured to receive and distribute air to the airfoil 14 for cooling purposes. Examples of the cavity 40 may include a corridor, an enclosure, or a chamber. The bus 38 may be any component of the airfoil 14 which extends inwardly from the inner surface 30 of the wall 10 and which restricts the flow of air from the passage 44. Examples of the bus 38 may include a partition, a ridge, or a barrier.

As shown in FIGS. 3 and 4, the protrusion 16 may be located on the side of the wall 10 or may be a portion of the wall 10. A portion of the outer edge 18 of the plate 12 may be fixedly coupled to surface 46 of the protrusion 16. Where the protrusion 16 is located on the side of the wall 10, the protrusion 16 may be aligned with the raised surface 20 of the wall 10. The surface 46 of the protrusion 16 may be vertically aligned with the raised surface 20 or may be vertically offset from the raised surface 20 such, once the plate 12 is fixedly coupled to the protrusion 16, the outer edge 18 of the plate 12 is above, below, or vertically aligned with the raised surface 20.

As shown in FIGS. 3 and 4, the outlets 24 of the passage 44 may be located along the side of the wall 10, as close as possible to the protrusion 16, to allow adequate cooling of the protrusion 16. In some embodiments, the outlets 24 may be located in the protrusion 16 to allow air purge gaps between walls 10 and cool adjacent components. In some embodiments, the inlet 22 of the passage 44 may be located between two adjacent plates 12, a gap between the respective outer edges 18 of each plate 12 defining the inlet 22. To accommodate complex shapes within the wall 10 created by the airfoil 14, multiple plates 12 may be used to cover the wall 10 and direct air to the passage 44 beneath the plates 12. Gaps between the raised surface 20 of the wall 10 and the plates 12 may define the inlets 22 of the passage 44. The cavity 40 may remain uncovered by the plates 12 to provide direct access for the air to flow into the airfoil 14.

In some embodiments, ribs 26 may be arranged across plates 12 to partition and direct the flow of air from the inlets 22 toward the outlets 24. As shown in FIG. 3, the ribs 26 may be arranged between adjacent airfoils 14 in parallel rows, extending from the outlets 24 located at a first side of the wall 10 to outlets 24 located at a second side of the wall 10. A plurality of pins 28 may be arranged between the ribs 26 to decrease laminar flow of air within the passage 44 and increase the efficiency of heat transfer from the wall 10.

Figure 5:
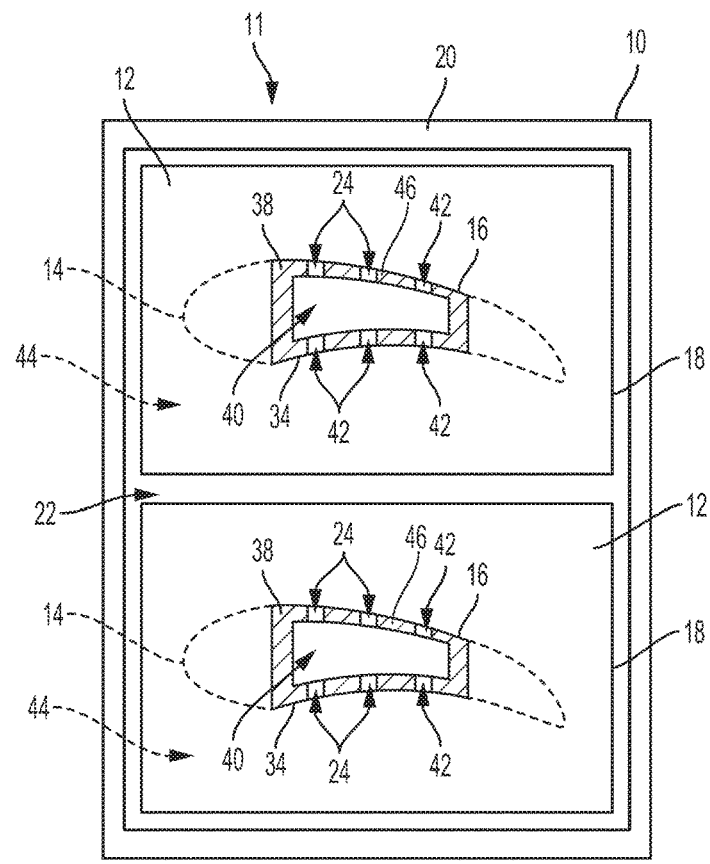
FIG. 5 illustrates a top-down partial cross-sectional view of a third example of an endwall cooling system.
Figure 6:
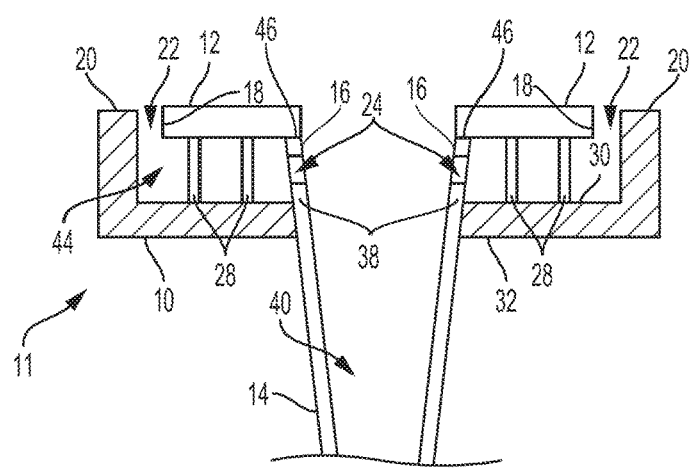
FIG. 6 illustrates a side cross-sectional view of the third example of the endwall cooling system shown in FIG. 5.

FIGS. 5 and 6 illustrate cross-sectional views of a third example of an air distribution system 11 including the wall 10, the plate 12, and the airfoil 14. As shown in FIGS. 5 and 6, the protrusion 16 may be a portion of the bus 38 of the airfoil 14. In such an embodiment the plate 12 may be fixedly coupled to a portion or the entirety of the circumference of the bus 38. In such embodiments, the plate 12 may radiate outwardly from the bus 38 to cover the wall 10 and define the passage 44. The interior of the plate 12 may be open to allow air to freely enter the cavity 40 of the airfoil 14. Where multiple airfoils 14 are present, multiple plates 12 may be placed alongside one another, each radiating outwardly from their respective airfoil 14. The inlet 22 of the passage 44 may be defined by gaps formed between adjacent plates 12 and between the plates 12 and the raised surface 20 of the wall 10. The outlet 24 of the passage 44 may be located within the bus 38, directing air exiting the passage 44 into the cavity 40 of the airfoil 14.

Figure 7:
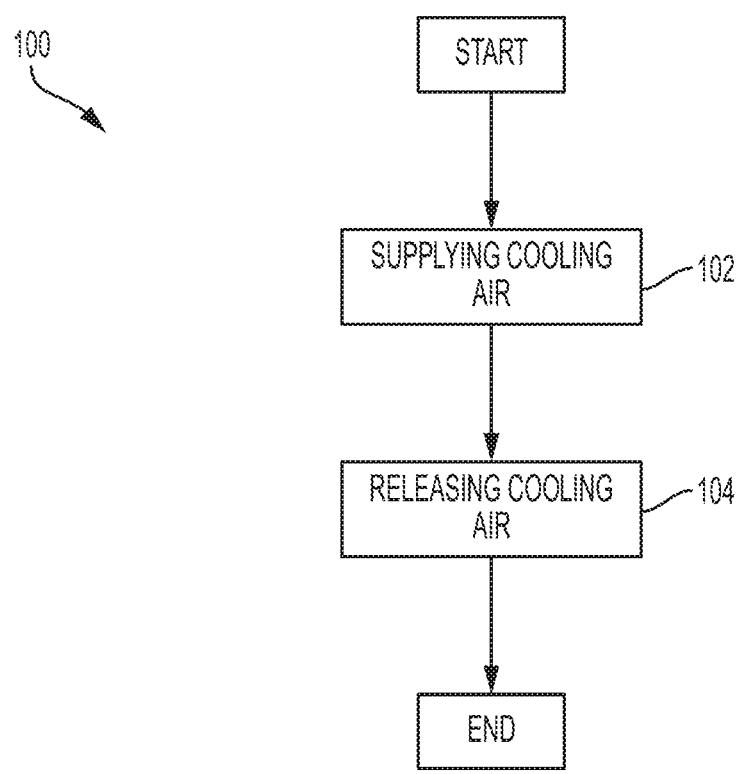
FIG. 7 illustrates a flow diagram of an example of a method of cooling a component of a turbine vane.

FIG. 7 illustrates a flow diagram of an example of a system to cooling a component of a turbine vane (70 in FIG. 9) (100). The steps may include additional, different, or fewer operations than illustrated in FIG. 7. The steps may be executed in a different order than illustrated in FIG. 7.

The wall 10 may be cooled (100) by initially supplying cooling air to the passage 44 (102). The passage 44 may be defined between the wall 10 and the plate 12, where the plate 12 is spaced apart from the wall 10. A protrusion 16 extends between the plate 12 and the wall 10, where the protrusion 16 is fixedly coupled to the plate 12. The cooling air is supplied to the passage 44 at an inlet 22 defined by the outer edge 18 of the plate 12.

Once the cooling air has been supplied to the passage 44 (102), the cooling air may be released from the passage 44 (104) through the outlet 24 of the passage 44. The outlet 24 may be located at the opening in the wall 10 to the outer surface 32 of the wall 10. Alternatively, the air may be released into a cavity 40 of the airfoil 14.

Each component may include additional, different, or fewer components. For example, the passage 44 may comprise a plurality of inlets 22 and outlets 24. Additionally, the wall 10 and the plate 12 may comprises a plurality of ribs 26 and pins 28 extending into the passage 44.

The system (100) may be implemented with additional, different, or fewer components. For example, a plurality of plates 12 may be used to define the passage 44. Additionally, the protrusion 16 may be formed from a portion of the wall 10 or from the bus 38 of the airfoil 14 extending inwardly from the inner surface 30 of the wall 10.

The logic illustrated in the flow diagrams may include additional, different, or fewer operations than illustrated. The operations illustrated may be performed in an order different than illustrated.

Figure 8:
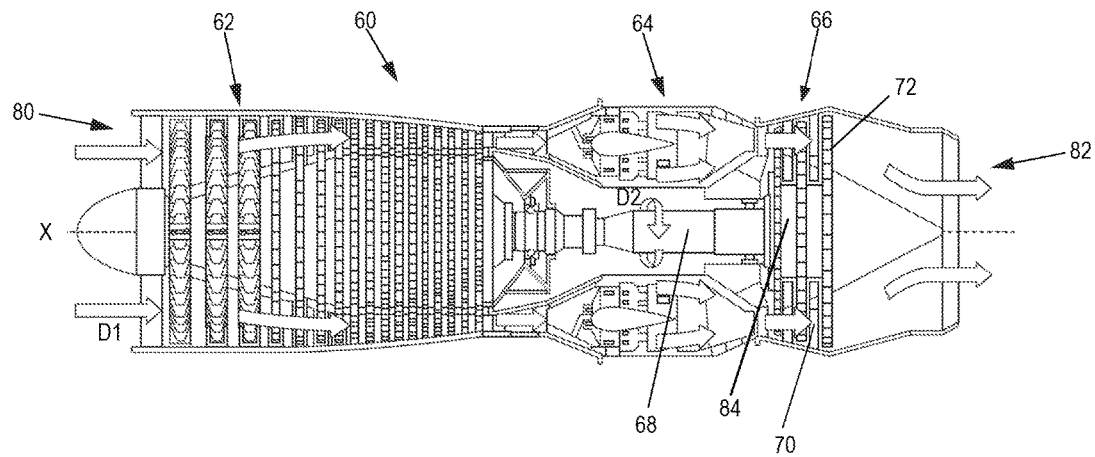
FIG. 8 illustrates a cross-sectional view of an example of a gas turbine engine.

FIG. 8 is a cross-sectional view of a gas turbine engine 60 for propulsion of, for example, an aircraft. Alternatively or in addition, the gas turbine engine 60 may be used to drive a propeller in aquatic applications, or to drive a generator in energy applications. The gas turbine engine 60 may include an intake section 80, a compressor section 62, a combustion section 64, a turbine section 66, and an exhaust section 82. During operation of the gas turbine engine 60, fluid received from the intake section 80, such as air, travels along the direction D1 and may be compressed within the compressor section 62. The compressed fluid may then be mixed with fuel and the mixture may be burned in the combustion section 64. The combustion section 64 may include any suitable fuel injection and combustion mechanisms. The hot, high pressure fluid may then pass through the turbine section 66 to extract energy from the fluid and cause a turbine shaft 68 of a turbine 84 in the turbine section 66 to rotate, which in turn drives the compressor section 62. Discharge fluid may exit the exhaust section 82.

As noted above, the hot, high pressure fluid passes through the turbine section 66 during operation of the gas turbine engine 60. As the fluid flows through the turbine section 66, the fluid passes between alternating blades 72 and vanes 70 causing the turbine 84 to rotate. The rotating turbine 84 may turn a shaft 68 in a rotational direction D2, for example. The blades 72 may rotate around an axis of rotation, which may correspond to a centerline X of the turbine 84 in some examples. The vanes 70 may remain stationary relative to the blades 72 while the turbine 84 is rotating.

Figure 9:
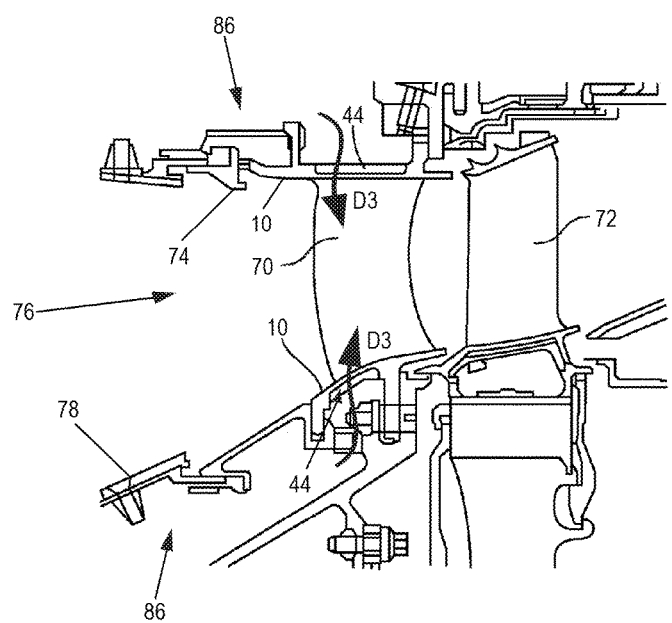
FIG. 9 illustrates a cross-sectional view of a portion of an example of a turbine section of a gas turbine engine.

FIG. 9 is a cross-sectional view of a portion of an example of the turbine section 76. The turbine vane 70 may extend across the turbine flow path 76 and may be coupled to an outer combustion liner 74 and an inner combustion liner 78. Air for cooling may be delivered to the passage 44 from a hub 86 adjacent to either of the inner combustion liner 78 or the outer combustion liner 74. The air flows along the direction D3 from the hub 86, through the passage 44, and into the turbine flow path 76 to cool the wall 10. As shown in FIG. 9, the wall 10 may be a portion of the turbine vane 70 which extends along the surface of the turbine flow path 76 and allows the turbine vane 70 to complete the turbine flow path between the upstream and downstream components.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. An air distribution system for cooling a component in a heated gas environment, comprising:
a wall comprising an inner surface, an outer surface configured to be exposed to the heated gas environment, and a protrusion extending from the inner surface of the wall; and
a plate spaced apart from the inner surface of the wall, the plate comprising an outer edge, the plate fixedly coupled to the protrusion, wherein a passage is defined between the plate and the inner surface of the wall, and wherein an inlet of the passage is defined by the outer edge of the plate.

2. The air distribution system of aspect 1, wherein the wall comprises an opening extending between the inner surface and the outer surface of the wall, the opening defining an outlet of the passage.

3. The air distribution system of aspect 2, wherein the opening of the wall is arranged proximate to the protrusion.

4. The air distribution system of any of aspects 2 and 3, wherein the opening is positioned on the wall so as to maximize distance between the outer edge of the plate and the opening of the wall.

5. The air distribution system of any of aspects 1-4, wherein the protrusion is fixedly coupled to a center of the plate.

6. The air distribution system of any of aspects 1-4, wherein the protrusion is fixedly coupled to a portion of the outer edge of the plate.

7. The air distribution system of any of aspects 1-6, wherein one of the wall or the plate comprises a rib extending into the passage, wherein the rib is configured to direct air flow from the inlet of the passage to an outlet of the passage.

8. The air distribution system of any of aspects 1-7, wherein the plate comprises an intact surface extending from a first outer edge of the plate to an opposing second outer edge of the plate.

9. The air distribution system of any of aspects 1-8, wherein one of the wall or the plate comprises a plurality of pins extending in the passage, and wherein the plurality of pins are shaped and arranged to create turbulence in a fluid that passes through the passage.

10. The air distribution system of any of aspects 1-9, comprising a plurality of plates and a plurality of protrusions, wherein each plate is coupled one of the plurality of protrusions, wherein each of the plurality of plates is spaced apart from each another, and wherein the inlet of the passage is at least partially defined by a gap between the respective outer edges of at least two of the plurality of plates.

11. A turbine vane comprising:
a wall comprising an inner surface, an outer surface, and a protrusion extending from the inner surface of the wall;
a plate spaced apart from the inner surface of the wall, the plate comprising an outer edge wherein the plate is fixedly coupled to the protrusion; and
an airfoil extending outwardly from the outer surface of the wall; wherein a passage is defined between the plate and the inner surface of the wall, and wherein an inlet of the passage is defined by the outer edge of the plate.

12. The turbine vane of aspect 11, wherein a perimeter of the plate defined by the outer edge of the plate is greater than a perimeter of the protrusion which is fixedly coupled to the plate.

13. The turbine vane of any of aspects 11 and 12, further comprising a cavity within the airfoil, the passage having an outlet which is in fluid communication with the cavity of the airfoil.

14. The turbine vane of any of aspects 11 and 12, wherein the airfoil comprises a boss which extends inwardly from the inner surface of the wall, wherein the outlet of the passage is defined by an opening in the boss.

15. The turbine vane of aspect 14, wherein the protrusion is the boss of the airfoil.

16. The turbine vane of aspect 15, wherein the plate encircles the boss of the airfoil.

17. The turbine vane of any of aspects 11-16, wherein the wall comprises a raised element extending transversely to and aligned with the outer edge of the plate, wherein the inlet of the passage is at least partially defined by a gap between the raised element of the wall and the outer edge of the plate.

18. A method of cooling a component of a turbine vane comprising:

supplying cooling air to a passage, wherein the passage is defined between the wall of the turbine vane and a plate spaced apart from the wall, wherein the plate is fixedly coupled to a protrusion which extends between the plate and the wall, and wherein an inlet of the passage is defined by an outer edge of the plate; and releasing the cooling air from the passage through an outlet of the passage.

19. The method of aspect 18, wherein the cooling air is released through an opening in the wall to an outer surface of the wall.

20. The method of aspect 18, wherein the cooling air is released into a cavity of an airfoil of the turbine vane.

What is claimed is:

1. An air distribution system for cooling a component in a heated gas environment of a gas turbine engine, comprising:
    a wall comprising an inner surface, an outer surface configured to be exposed to the heated gas environment, and a protrusion extending from the inner surface of the wall; and
    a plate spaced apart from the inner surface of the wall, the plate comprising an outer edge, the plate fixedly coupled to the protrusion, wherein a passage is defined between the plate and the inner surface of the wall, and wherein an inlet of the passage is defined by the outer edge of the plate.

2. The air distribution system of claim 1, wherein the wall comprises an opening extending between the inner surface and the outer surface of the wall, the opening defining an outlet of the passage.

3. The air distribution system of claim 2, wherein the opening of the wall is arranged proximate to the protrusion.

4. The air distribution system of claim 2, wherein the opening is positioned on the wall so as to maximize distance between the outer edge of the plate and the opening of the wall.

5. The air distribution system of claim 1, wherein the protrusion is fixedly coupled to a center of the plate.

6. The air distribution system of claim 1, wherein the protrusion is fixedly coupled to a portion of the outer edge of the plate.

7. The air distribution system of claim 1, wherein one of the wall or the plate comprises a rib extending into the passage, wherein the rib is configured to direct air flow from the inlet of the passage to an outlet of the passage.

8. The air distribution system of claim 1, wherein the plate comprises an intact surface extending from a first outer edge of the plate to an opposing second outer edge of the plate.

9. The air distribution system of claim 1, wherein one of the wall or the plate comprises a plurality of pins extending in the passage, and wherein the plurality of pins are shaped and arranged to create turbulence in a fluid that passes through the passage.

10. The air distribution system of claim 1, comprising a plurality of plates and a plurality of protrusions, wherein each plate is coupled one of the plurality of protrusions, wherein each of the plurality of plates is spaced apart from each another, and wherein the inlet of the passage is at least partially defined by a gap between the respective outer edges of at least two of the plurality of plates.

11. A turbine vane comprising:
    a wall comprising an inner surface, an outer surface, and a protrusion extending from the inner surface of the wall;
    a plate spaced apart from the inner surface of the wall, the plate comprising an outer edge, wherein the plate is fixedly coupled to the protrusion; and
    an airfoil extending outwardly from the outer surface of the wall, wherein a passage is defined between the plate and the inner surface of the wall, and wherein an inlet of the passage is defined by the outer edge of the plate.

12. The turbine vane of claim 11, wherein a perimeter of the plate defined by the outer edge of the plate is greater than a perimeter of the protrusion which is fixedly coupled to the plate.

13. The turbine vane of claim 11, further comprising a cavity within the airfoil, the passage having an outlet which is in fluid communication with the cavity of the airfoil.

14. The turbine vane of claim 13, wherein the airfoil comprises a boss which extends inwardly from the inner surface of the wall, wherein the outlet of the passage is defined by an opening in the boss.

15. The turbine vane of claim 14, wherein the protrusion is the boss of the airfoil.

16. The turbine vane of claim 15, wherein the plate encircles the boss of the airfoil.

17. The turbine vane of claim 16, wherein the wall comprises a raised element extending transversely to and aligned with the outer edge of the plate, wherein the inlet of the passage is at least partially defined by a gap between the raised element of the wall and the outer edge of the plate.

18. A method of cooling a component of a turbine vane comprising:

supplying cooling air to a passage, wherein the passage is defined by a wall of the turbine vane and a plate spaced apart from the wall, wherein the plate is fixedly coupled to a protrusion which extends between the plate and the wall, and wherein an inlet of the passage is defined by an outer edge of the plate; and releasing the cooling air from the passage through an outlet of the passage.

19. The method of claim 18, wherein the cooling air is released through an opening in the wall to an outer surface of the wall.

20. The method of claim 18, wherein the cooling air is released into a cavity of an airfoil of the turbine vane.

* * * * *